US012650501B2

(12) United States Patent
Rodrigo Marco et al.

(10) Patent No.: US 12,650,501 B2
(45) Date of Patent: Jun. 9, 2026

(54) SYSTEMS AND METHODS FOR ONLINE DOPPLER LiDAR CALIBRATION FOR ROAD VEHICLES

(71) Applicant: Torc Robotics, Inc., Blacksburg, VA (US)

(72) Inventors: Vicent Rodrigo Marco, Stuttgart (DE); Rubing Wang, Stuttgart (DE); Matthew Marti, Blacksburg, VA (US); Joseph Wade Foster, Arlington, VA (US); Marco Busch, Munich (DE)

(73) Assignee: Torc Robotics, Inc., Blacksburg, VA (US)

( * ) Notice: Subject to any disclaimer, the term of this patent is extended or adjusted under 35 U.S.C. 154(b) by 27 days.

(21) Appl. No.: 18/883,722

(22) Filed: Sep. 12, 2024

(65) Prior Publication Data

US 2026/0072146 A1 Mar. 12, 2026

(51) Int. Cl.
| | |
|---|---|
| *G01S 7/497* | (2006.01) |
| *B60W 60/00* | (2020.01) |
| *G01S 17/58* | (2006.01) |
| *G01S 17/931* | (2020.01) |

(52) U.S. Cl.
CPC ......... *G01S 7/4972* (2013.01); *B60W 60/001* (2020.02); *G01S 17/58* (2013.01); *G01S 17/931* (2020.01); *B60W 2420/408* (2024.01); *B60W 2554/20* (2020.02); *B60W 2554/804* (2020.02)

(58) Field of Classification Search
CPC .................. G01S 7/4972; G01S 17/58; B60W 2420/408; B60W 2554/804
See application file for complete search history.

(56) References Cited

U.S. PATENT DOCUMENTS

| | | | |
|---|---|---|---|
| 9,255,988 | B2 | 2/2016 | Zeng et al. |
| 9,916,703 | B2 | 3/2018 | Levinson et al. |
| 10,088,553 | B2 | 10/2018 | Zeng et al. |

(Continued)

FOREIGN PATENT DOCUMENTS

EP 3907522 A2 11/2021

OTHER PUBLICATIONS

Persic et al, "Extrinsic 6DoF calibration of 3D LiDAR and radar", IEEE 2017 European Conference on Mobile Robots (ECMR), Sep. 6-8, 2017, DOI 10.1109/ECMR.2017.8098688.

(Continued)

*Primary Examiner* — Tarek Elarabi
(74) *Attorney, Agent, or Firm* — Armstrong Teasdale LLP

(57) ABSTRACT

A system for sensor calibration is provided. The system includes a processor in communication with a memory device and a plurality of LiDAR sensors of an autonomous vehicle. The processor is configured to detect, based on data received from a first LiDAR sensor of the plurality of LiDAR sensors, a relative velocity of the autonomous vehicle to a static object while the autonomous vehicle is traveling along a straight trajectory, compute, based on the relative velocity, a vector representing a velocity estimate of the autonomous vehicle, identify the first LiDAR sensor as misaligned when a lateral component of the computed vector is greater than a threshold lateral component, and store, in the memory device, a status of the first LiDAR sensor as misaligned, wherein the autonomous vehicle is controlled based in part on the status of the first LiDAR sensor.

20 Claims, 4 Drawing Sheets

(56)  References Cited

U.S. PATENT DOCUMENTS

| | | | |
|---|---|---|---|
| 10,591,584 B2 | 3/2020 | Bialer et al. | |
| 11,166,010 B2 | 11/2021 | Lee et al. | |
| 11,187,793 B1 * | 11/2021 | Liu | G05D 1/0214 |
| 11,294,059 B1 | 4/2022 | Hexsel et al. | |
| 11,555,919 B2 | 1/2023 | McEwan et al. | |
| 11,592,559 B2 * | 2/2023 | Herman | G06N 3/045 |
| 11,609,305 B2 | 3/2023 | Dvorecki et al. | |
| 2015/0276923 A1 | 10/2015 | Song et al. | |
| 2017/0261599 A1 | 9/2017 | Zeng et al. | |
| 2019/0187250 A1 * | 6/2019 | Ru | G01S 7/4052 |
| 2021/0173055 A1 | 6/2021 | Jian et al. | |
| 2021/0239793 A1 | 8/2021 | Yu et al. | |
| 2021/0263154 A1 * | 8/2021 | Herman | G01S 17/86 |
| 2022/0097725 A1 * | 3/2022 | Corte | G06V 20/58 |
| 2022/0163635 A1 | 5/2022 | Dunn et al. | |
| 2022/0404506 A1 | 12/2022 | Hu et al. | |
| 2023/0066919 A1 | 3/2023 | Navin et al. | |
| 2023/0068113 A1 | 3/2023 | Abari et al. | |
| 2023/0145561 A1 | 5/2023 | Miao et al. | |
| 2023/0334673 A1 | 10/2023 | Rajan et al. | |
| 2024/0255612 A1 | 8/2024 | Akamine et al. | |

OTHER PUBLICATIONS

Natour et al, "Radar and vision sensors calibration for outdoor 3D reconstruction", IEEE 2015 International Conference on Robotics and Automation (ICRA), May 26-30, 2015, DOI: 10.1109/ICRA. 2015.7139473.

* cited by examiner

100

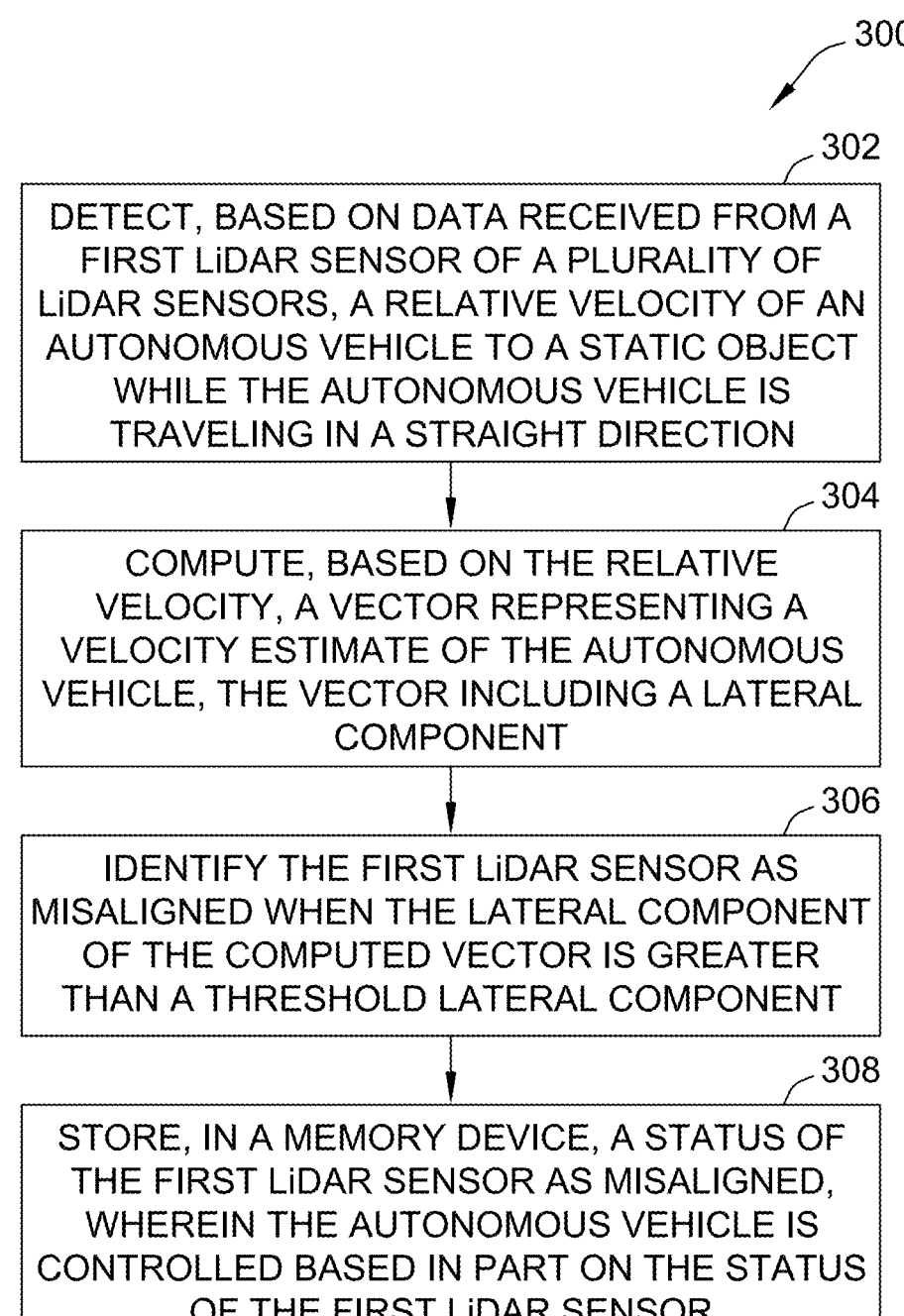

300

302

DETECT, BASED ON DATA RECEIVED FROM A FIRST LiDAR SENSOR OF A PLURALITY OF LiDAR SENSORS, A RELATIVE VELOCITY OF AN AUTONOMOUS VEHICLE TO A STATIC OBJECT WHILE THE AUTONOMOUS VEHICLE IS TRAVELING IN A STRAIGHT DIRECTION

304

COMPUTE, BASED ON THE RELATIVE VELOCITY, A VECTOR REPRESENTING A VELOCITY ESTIMATE OF THE AUTONOMOUS VEHICLE, THE VECTOR INCLUDING A LATERAL COMPONENT

306

IDENTIFY THE FIRST LiDAR SENSOR AS MISALIGNED WHEN THE LATERAL COMPONENT OF THE COMPUTED VECTOR IS GREATER THAN A THRESHOLD LATERAL COMPONENT

308

STORE, IN A MEMORY DEVICE, A STATUS OF THE FIRST LiDAR SENSOR AS MISALIGNED, WHEREIN THE AUTONOMOUS VEHICLE IS CONTROLLED BASED IN PART ON THE STATUS OF THE FIRST LiDAR SENSOR

FIG. 3

SYSTEMS AND METHODS FOR ONLINE DOPPLER LiDAR CALIBRATION FOR ROAD VEHICLES

TECHNICAL FIELD

The field of the disclosure relates generally to vehicle sensor systems and, more specifically, to systems for identifying and recalibrating misaligned sensors of a vehicle while the vehicle is online.

BACKGROUND OF THE INVENTION

The integration of data from various sensor technologies, known as multi-source and multi-modal sensor fusion, is used in automated driving systems, such as those used in autonomous vehicles. This integration plays an essential role in overcoming limitations associated with relying on a single sensor source, particularly for key functions within an automated driving system, such as motion estimation, localization, or environment recognition.

Vehicle assembly techniques generally allow for certain tolerances that may lead to errors in orientations of vehicle sensors. Additionally, during operation, an orientation of sensors may be altered due to wear, vibrations, or physical damage. These orientation errors deteriorate the performance of autonomous driving systems that utilize data generated by these sensors. In some cases, this may lead to safety hazards during autonomous driving such as inaccurate object detection and tracking, motion estimation, or localization. A system capable of identifying and correcting such orientation errors is therefore desirable.

This section is intended to introduce the reader to various aspects of art that may be related to various aspects of the present disclosure described or claimed below. This description is believed to be helpful in providing the reader with background information to facilitate a better understanding of the various aspects of the present disclosure. Accordingly, it should be understood that these statements are to be read in this light and not as admissions of prior art.

SUMMARY OF THE INVENTION

In one aspect, a system for sensor calibration is provided. The system includes a processor in communication with a memory device and a plurality of LiDAR sensors of an autonomous vehicle. The processor is configured to detect, based on data received from a first LiDAR sensor of the plurality of LiDAR sensors, a relative velocity of the autonomous vehicle to a static object while the autonomous vehicle is traveling along a straight trajectory, compute, based on the relative velocity, a vector representing a velocity estimate of the autonomous vehicle, the vector including a lateral component, identify the first LiDAR sensor as misaligned when the lateral component of the computed vector is greater than a threshold lateral component, and store, in the memory device, a status of the first LiDAR sensor as misaligned, wherein the autonomous vehicle is controlled based in part on the status of the first LiDAR sensor.

In another aspect, a method for sensor calibration is provided. The method is performed by a processor in communication with a memory device and a plurality of LiDAR sensors of an autonomous vehicle. The method includes detecting, based on data received from a first LiDAR sensor of the plurality of LiDAR sensors, a relative velocity of the autonomous vehicle to a static object while the autonomous vehicle is traveling along a straight trajectory, computing, based on the relative velocity, a vector representing a velocity estimate of the autonomous vehicle, the vector including a lateral component, identifying the first LiDAR sensor as misaligned when the lateral component of the computed vector is greater than a threshold lateral component, and storing, in the memory device, a status of the first LiDAR sensor as misaligned, wherein the autonomous vehicle is controlled based in part on the status of the first LiDAR sensor.

In yet another aspect, an autonomous vehicle is provided. The autonomous vehicle includes a plurality of LiDAR sensors, a memory device, and a processor in communication with the memory device and the plurality of LiDAR sensors. The processor is configured to detect, based on data received from a first LiDAR sensor of the plurality of LiDAR sensors, a relative velocity of the autonomous vehicle to a static object while the autonomous vehicle is traveling along a straight trajectory, compute, based on the relative velocity, a vector representing a velocity estimate of the autonomous vehicle, the vector including a lateral component, identify the first LiDAR sensor as misaligned when the lateral component of the computed vector is greater than a threshold lateral component, store, in the memory device, a status of the first LiDAR sensor as misaligned, and control the autonomous vehicle based in part on the status of the first LiDAR sensor.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated examples may be incorporated into any of the above-described aspects, alone or in any combination.

BRIEF DESCRIPTION OF DRAWINGS

The following drawings form part of the present specification and are included to further demonstrate certain aspects of the present disclosure. The disclosure may be better understood by reference to one or more of these drawings in combination with the detailed description of specific embodiments presented herein.

FIG. 3 is a flow chart depicting an example method for sensor calibration; and

Figure 1:
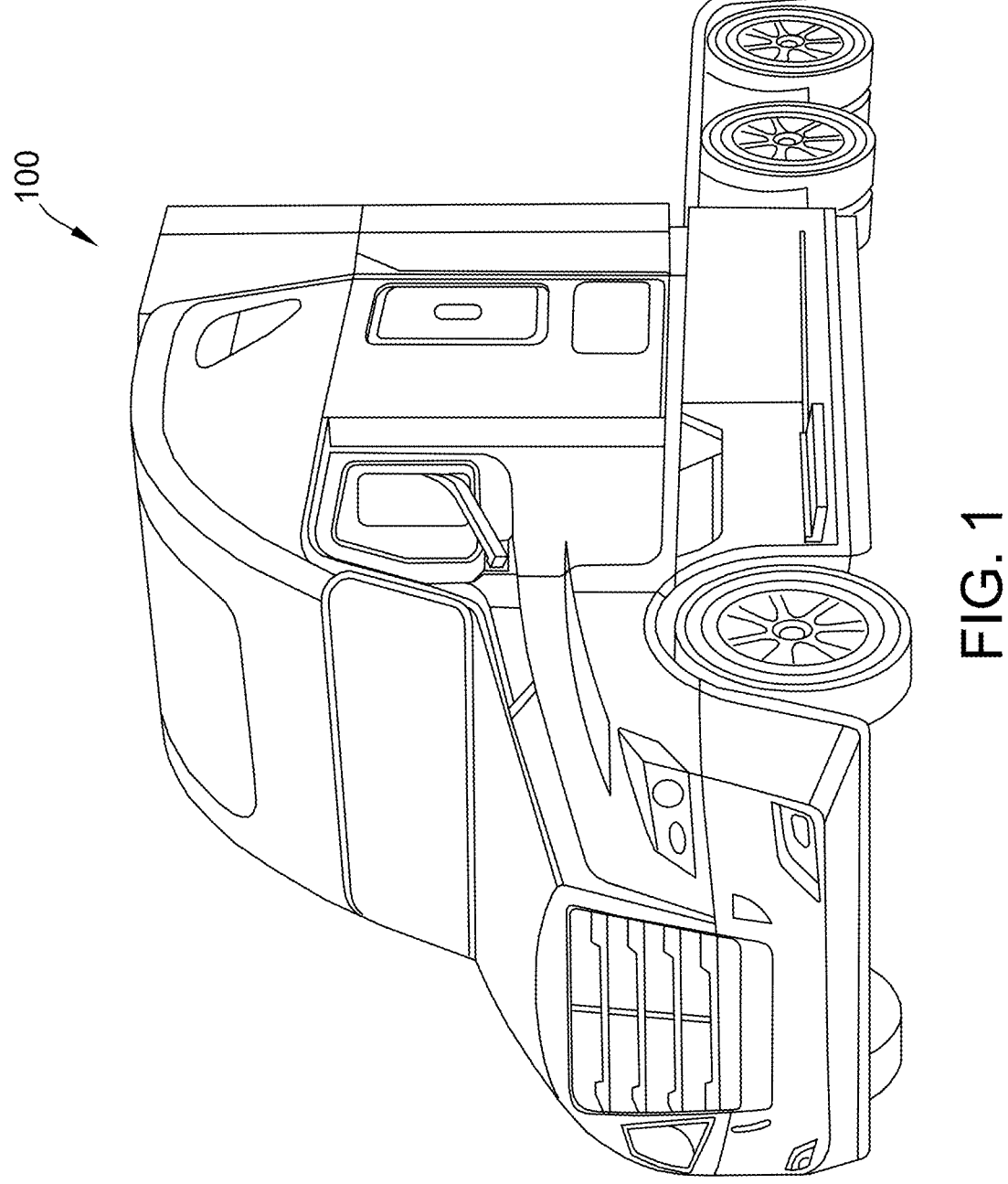
FIG. 1 is a schematic diagram of an autonomous vehicle.

Corresponding reference characters indicate corresponding parts throughout the several views of the drawings. Although specific features of various examples may be shown in some drawings and not in others, this is for convenience only. Any feature of any drawing may be referenced or claimed in combination with any feature of any other drawing. The drawings are not to scale unless otherwise noted.

DETAILED DESCRIPTION

The following detailed description and examples set forth preferred materials, components, and procedures used in accordance with the present disclosure. This description and these examples, however, are provided by way of illustration only, and nothing therein shall be deemed to be a limitation upon the overall scope of the present disclosure.

The disclosed systems and methods are described, for clarity, using certain terminology when referring to and describing relevant components within the disclosure. Where possible, common industry terminology is employed in a manner consistent with its accepted meaning. Unless otherwise stated, such terminology should be given a broad interpretation consistent with the context of the present application and the scope of the appended claims.

The embodiments described herein include a system for sensor calibration, which includes a processor in communication with a memory device and a plurality of LiDAR sensors of an autonomous vehicle. The system is configured to detect, based on data received from a first LiDAR sensor of the plurality of LiDAR sensors, a relative velocity of the autonomous vehicle to a static object while the autonomous vehicle is traveling in a known direction, such as a straight direction, and, based on this detection, a vector representing a velocity estimate of the autonomous vehicle. This vector includes a lateral component, which if greater than zero, indicates the vehicle is predicted to be moving in a lateral direction (e.g., the vehicle is turning).

Accordingly, if the vehicle is traveling along a straight trajectory and the LiDAR sensor is aligned properly, after applying the known lidar-to-vehicle orientation and, therewith, expressing the vector in vehicle coordinates, the lateral component of the vector should be zero. Therefore, if the lateral component of the computed vector is greater than a threshold lateral component while the autonomous vehicle is known to be traveling along a straight trajectory, the system is configured to identify the first LiDAR sensor as misaligned. The system may store, in the memory device, a status of the first LiDAR sensor as misaligned, and the autonomous vehicle may be controlled based in part on the status of the first LiDAR sensor. For example, data from misaligned LiDAR sensors may be ignored during operation of the autonomous vehicle, or the system may correct data generated by misaligned LiDAR sensors prior to using the data.

The system described herein provides certain technical advantages over known sensor calibration systems. For example, the system described herein enables calibration to be performed while the vehicle is on-line (e.g., during normal driving), and does not require any dedicated infrastructure such as predefined target objects for the calibration procedure. Additionally, no extrinsic measurement of the position and orientation of the LiDAR sensors is required. Further, a calibration of an individual LiDAR sensor can be determined by the system based on data from that LiDAR sensor without requiring data from other LiDAR sensors or perception sensors or extrinsic data such as digital maps.

Figure 2:
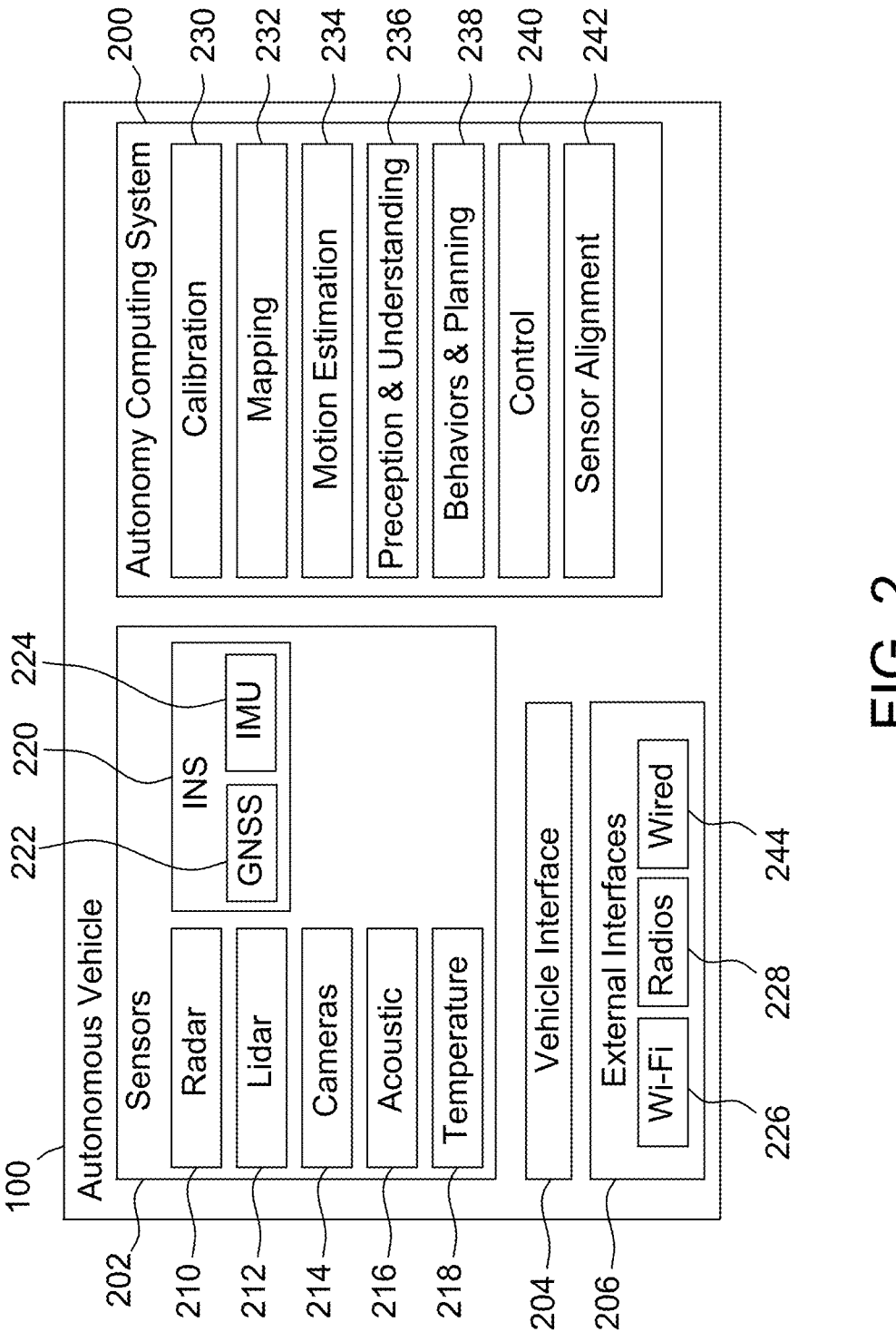
FIG. 2 is a block diagram of an autonomous vehicle.

FIG. 1 is a schematic diagram of an autonomous vehicle 100. FIG. 2 is a block diagram of autonomous vehicle 100 shown in FIG. 1. In the example embodiment, autonomous vehicle 100 includes autonomy computing system 200, sensors 202, a vehicle interface 204, and external interfaces 206.

In the example embodiment, sensors 202 may include various sensors such as, for example, radio detection and ranging (RADAR) sensors 210, light detection and ranging (LiDAR) sensors 212, cameras 214, acoustic sensors 216, temperature sensors 218, or inertial navigation system (INS) 220, which may include one or more global navigation satellite system (GNSS) receivers 222 and one or more inertial measurement units (IMU) 224. Other sensors 202 not shown in FIG. 2 may include, for example, acoustic (e.g., ultrasound), internal vehicle sensors, meteorological sensors, or other types of sensors. Sensors 202 generate respective output signals based on detected physical conditions of autonomous vehicle 100 and its proximity. As described in further detail below, these signals may be used by autonomy computing system 120 to determine how to control operation of autonomous vehicle 100.

Cameras 214 are configured to capture images of the environment surrounding autonomous vehicle 100 in any aspect or field of view (FOV). The FOV can have any angle or aspect such that images of the areas ahead of, to the side, behind, above, or below autonomous vehicle 100 may be captured. In some embodiments, the FOV may be limited to particular areas around autonomous vehicle 100 (e.g., forward of autonomous vehicle 100, to the sides of autonomous vehicle 100, etc.) or may surround 360 degrees of autonomous vehicle 100. In some embodiments, autonomous vehicle 100 includes multiple cameras 214, and the images from each of the multiple cameras 214 may be stitched or combined to generate a visual representation of the multiple cameras' FOVs, which may be used to, for example, generate a bird's eye view of the environment surrounding autonomous vehicle 100. In some embodiments, the image data generated by cameras 214 may be sent to autonomy computing system 200 or other aspects of autonomous vehicle 100, and this image data may include autonomous vehicle 100 or a generated representation of autonomous vehicle 100. In some embodiments, one or more systems or components of autonomy computing system 200 may overlay labels to the features depicted in the image data, such as on a raster layer or other semantic layer of a high-definition (HD) map.

LiDAR sensors 212 generally include a laser generator and a detector that send and receive a LiDAR signal such that LiDAR point clouds (or "LiDAR images") of the areas ahead of, to the side, behind, above, or below autonomous vehicle 100 can be captured and represented in the LiDAR point clouds. Radar sensors 210 may include short-range RADAR (SRR), mid-range RADAR (MRR), long-range RADAR (LRR), or ground-penetrating RADAR (GPR). One or more sensors may emit radio waves, and a processor may process received reflected data (e.g., raw radar sensor data) from the emitted radio waves. In some embodiments, the system inputs from cameras 214, radar sensors 210, or LiDAR sensors 212 may be fused or used in combination to determine conditions (e.g., locations of other objects) around autonomous vehicle 100.

GNSS receiver 222 is positioned on autonomous vehicle 100 and may be configured to determine a location of autonomous vehicle 100, which it may embody as GNSS data, as described herein. GNSS receiver 222 may be configured to receive one or more signals from a global navigation satellite system (e.g., Global Positioning System (GPS) constellation) to localize autonomous vehicle 100 via geolocation. In some embodiments, GNSS receiver 222 may provide an input to or be configured to interact with, update, or otherwise utilize one or more digital maps, such as an HD map (e.g., in a raster layer or other semantic map). In some embodiments, GNSS receiver 222 may provide direct velocity measurement via inspection of the Doppler effect on the signal carrier wave. Multiple GNSS receivers 222 may also provide direct measurements of the orientation of autonomous vehicle 100. For example, with two GNSS receivers 222, two attitude angles (e.g., roll and yaw) may be measured or determined. In some embodiments, autonomous vehicle 100 is configured to receive updates from an external network (e.g., a cellular network). The updates may include one or more of position data (e.g., serving as an alternative or supplement to GNSS data), speed/direction data, orientation or attitude data, traffic data, weather data, or other types of data about autonomous vehicle 100 and its environment.

IMU 224 is a micro-electrical-mechanical (MEMS) device that measures and reports one or more features regarding the motion of autonomous vehicle 100, although other implementations are contemplated, such as mechanical, fiber-optic gyro (FOG), or FOG-on-chip (SiFOG) devices. IMU 224 may measure an acceleration, angular rate, and or an orientation of autonomous vehicle 100 or one or more of its individual components using a combination of accelerometers, gyroscopes, or magnetometers. IMU 224 may detect linear acceleration using one or more accelerometers and rotational rate using one or more gyroscopes and attitude information from one or more magnetometers. In some embodiments, IMU 224 may be communicatively coupled to one or more other systems, for example, GNSS receiver 222 and may provide input to and receive output from GNSS receiver 222 such that autonomy computing system 200 is able to determine the motive characteristics (acceleration, speed/direction, orientation/attitude, etc.) of autonomous vehicle 100.

In the example embodiment, autonomy computing system 200 employs vehicle interface 204 to send commands to the various aspects of autonomous vehicle 100 that actually control the motion of autonomous vehicle 100 (e.g., engine, throttle, steering wheel, brakes, etc.) and to receive input data from one or more sensors 202 (e.g., internal sensors). External interfaces 206 are configured to enable autonomous vehicle 100 to communicate with an external network via, for example, a wired or wireless connection, such as Wi-Fi 226 or other radios 228. In embodiments including a wireless connection, the connection may be a wireless communication signal (e.g., Wi-Fi, cellular, LTE, 5 g, Bluetooth, etc.).

In some embodiments, external interfaces 206 may be configured to communicate with an external network via a wired connection 244, such as, for example, during testing of autonomous vehicle 100 or when downloading mission data after completion of a trip. The connection(s) may be used to download and install various lines of code in the form of digital files (e.g., HD maps), executable programs (e.g., navigation programs), and other computer-readable code that may be used by autonomous vehicle 100 to navigate or otherwise operate, either autonomously or semi-autonomously. The digital files, executable programs, and other computer readable code may be stored locally or remotely and may be routinely updated (e.g., automatically or manually) via external interfaces 206 or updated on demand. In some embodiments, autonomous vehicle 100 may deploy with all of the data it needs to complete a mission (e.g., perception, localization, and mission planning) and may not utilize a wireless connection or other connection while underway.

In the example embodiment, autonomy computing system 200 is implemented by one or more processors and memory devices of autonomous vehicle 100. Autonomy computing system 200 includes modules, which may be hardware components (e.g., processors or other circuits) or software components (e.g., computer applications or processes executable by autonomy computing system 200), configured to generate outputs, such as control signals, based on inputs received from, for example, sensors 202. These modules may include, for example, a calibration module 230, a mapping module 232, a motion estimation module 234, a perception and understanding module 236, a behaviors and planning module 238, a control module or controller 240, and a sensor alignment module 242. Sensor alignment module 242, for example, may be embodied within another module, or separately. These modules may be implemented in dedicated hardware such as, for example, an application specific integrated circuit (ASIC), field programmable gate array (FPGA), or microprocessor, or implemented as executable software modules, or firmware, written to memory and executed on one or more processors onboard autonomous vehicle 100.

Autonomy computing system 200 of autonomous vehicle 100 may be completely autonomous (fully autonomous) or semi-autonomous. In one example, autonomy computing system 200 can operate under Level 5 autonomy (e.g., full driving automation), Level 4 autonomy (e.g., high driving automation), or Level 3 autonomy (e.g., conditional driving automation). As used herein the term "autonomous" includes both fully autonomous and semi-autonomous.

Autonomy computing system 200 is configured to detect, using one of LiDAR sensors 212, a position of a static object (e.g., a stationary roadside object) while autonomous vehicle 100 is traveling. For example, autonomy computing system 200 may utilize random sample consensus (RANSAC) object detection or a machine learning model to detect a static object and determine its relative velocity (e.g. Doppler velocity) or relative position to autonomous vehicle 100 over a sample period of time. The static object does not necessarily need to be a predefined target object placed specifically for calibration purposes or predefined in a digital map, and can be any non-moving object autonomy computing system 200 is capable of recognizing in a stable manner. For this reason, calibration can be performed while autonomous vehicle 100 is on-line (e.g., during normal driving operations).

Autonomy computing system 200 is configured to compute a vector representing a velocity estimate of autonomous vehicle. The vector is computed based on the a relative velocity of the static object relative to the autonomous vehicle and a known orientation of LiDAR sensor 212 to autonomous vehicle 100. For example, the velocity of the vehicle may be estimated based on doppler velocities of the autonomous vehicle 100 with respect to the static object determined based on LiDAR data. The vector may be expressed using a coordinate system of autonomous vehicle 100. For example, the vector may be expressed in vehicle coordinates using the known lidar-to-vehicle coordinate transformation. The computed vector representing the velocity includes at least one dimension corresponding to a lateral component of the velocity. In some embodiments, the vector includes additional dimensions, such as dimensions corresponding to a longitudinal or vertical direction with respect to autonomous vehicle 100. In some cases, less than all dimensions of the vector may be considered to determine whether LiDAR sensor 212 is misaligned.

In some embodiments, to compute the vector, autonomy computing system 200 is configured to first compute an unfiltered vector as described above and then applying a filter to the unfiltered vector to reduce noise or other inaccuracies. The filter may be, for example, a Kalman filter. In some embodiments, the filter may include different weights or parameters that depend on a current state of autonomous vehicle 100, such as a current speed or velocity.

Autonomy computing system 200 is configured to determine when autonomous vehicle 100 is traveling along a straight trajectory (i.e., when the vehicle is not turning). For example, autonomy computing system 200 may compare vertical angular rate measurements to a threshold value to determine if autonomous vehicle 100 is traveling straight or turning. If an angular rate measurement is less than the threshold, autonomy computing system 200 determines that autonomous vehicle 100 is traveling straight. The angular rate measurements are generated inertial sensors or other sensors 202 of autonomous vehicle 100. Additionally, or alternatively, autonomy computing system 200 can determine whether autonomous vehicle is traveling straight or turning based on steering data, such as steering commands generated by controller 240 or other related data.

Under the assumption that autonomous vehicle 100 is traveling along a straight trajectory, a lateral component of the generated vector should be zero. Accordingly, autonomy computing system is configured to identify the LiDAR sensor 212 from which the vector was generated as misaligned if the lateral component of the vector is greater than zero or a tolerance threshold close to zero. Because the vector is generated by data from a single LiDAR sensor 212, this determination can be made without using data from other LiDAR sensors 212 or other perception sensors.

Autonomy computing system 200 is configured to store in the memory device of autonomous vehicle 100 a status of LiDAR sensors 212. For example, autonomy computing system 200 may track a status of each LiDAR sensor 212 as either "properly aligned" or "misaligned." Autonomous vehicle 100 is controlled based in part on these statuses. For example, data received from misaligned LiDAR sensors 212 may be handled differently than data received from properly aligned LiDAR sensors 212. In some embodiments, autonomy computing system 200 is configured to disregard data received from misaligned sensors 202 when it is safe to do so, such as when an adequate amount of data can be provided by other LiDAR sensors 212. In certain embodiments, autonomy computing system is configured to correct data received from misaligned LiDAR sensors 212. For example, autonomy computing system 200 may determine a misalignment angle based on the computed vector for a misaligned LiDAR sensors 212 and use the misalignment angle as a correction factor when controlling autonomous vehicle 100 based on data received from the misaligned LiDAR sensor 212.

FIG. 3 is a flowchart of an example method 300 for sensor calibration. In the example embodiment, method 300 is performed by autonomy computing system 200 (shown in FIG. 2) executing sensor alignment module 242. Autonomy computing system 200 detects 302, based on data received from a first LiDAR sensor 212 of a plurality of LiDAR sensors 212, a relative velocity of autonomous vehicle 100 to a static object while autonomous vehicle 100 is traveling along a straight trajectory. Autonomy computing system 200 computes 304, based on the relative velocity, a vector representing a velocity estimate of autonomous vehicle 100. The vector includes a lateral component. Autonomy computing system 200 identifies 306 the first LiDAR sensor 212 as misaligned when the lateral component of the computed vector is greater than a threshold lateral component. Autonomy computing system 200 stores 308, in a memory device, a status of the first LiDAR sensor 212 as misaligned. Autonomous vehicle 100 is controlled based in part on the status of the first LiDAR sensor 212.

In some embodiments, autonomy computing system 200 determines autonomous vehicle 100 is traveling along a straight trajectory based on a vertical angular rate or a lateral acceleration measurement generated by an inertial sensor of autonomous vehicle 100.

In certain embodiments, autonomy computing system 200 determines autonomous vehicle 100 is traveling along a straight trajectory based on steering data generated by a vehicle controller of autonomous vehicle 100.

In some embodiments, to detect the position of the static object, autonomy computing system 200 applies a RANSAC object detection algorithm or a machine learning model to the data received from the first LiDAR sensor 212.

In certain embodiments, to compute the vector, autonomy computing system 200 computes an unfiltered vector based on the relative velocity and computes the vector by applying a filter to the unfiltered vector. In some such embodiments, the filter is a Kalman filter.

In some embodiments, the vector is expressed in one dimension, two dimensions, or three dimensions.

In certain embodiments, the computed vector further includes a longitudinal component.

In some embodiments, autonomy computing system 200 determines a misalignment angle based on the computed vector. In certain such embodiments, the autonomous vehicle is controlled based in part on the misalignment angle.

Figure 4:
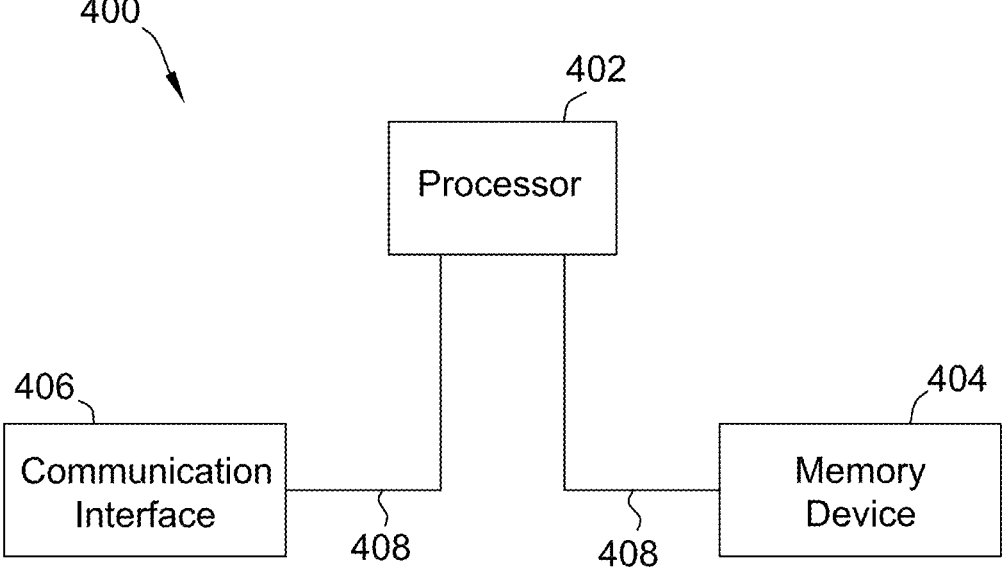
FIG. 4 is a block diagram of an example computing device.

FIG. 4 is a block diagram of an example computing device 400. Computing device 400 includes a processor 402 and a memory device 404. The processor 402 is coupled to the memory device 404 via a system bus 408. The term "processor" refers generally to any programmable system including systems and microcontrollers, reduced instruction set computers (RISC), complex instruction set computers (CISC), application specific integrated circuits (ASIC), programmable logic circuits (PLC), and any other circuit or processor capable of executing the functions described herein. The above examples are example only, and thus are not intended to limit in any way the definition or meaning of the term "processor."

In the example embodiment, the memory device 404 includes one or more devices that enable information, such as executable instructions or other data (e.g., sensor data), to be stored and retrieved. Moreover, the memory device 404 includes one or more computer readable media, such as, without limitation, dynamic random access memory (DRAM), static random access memory (SRAM), a solid state disk, or a hard disk. In the example embodiment, the memory device 404 stores, without limitation, application source code, application object code, configuration data, additional input events, application states, assertion statements, validation results, or any other type of data. The computing device 400, in the example embodiment, may also include a communication interface 406 that is coupled to the processor 402 via system bus 408. Moreover, the communication interface 406 is communicatively coupled to data acquisition devices.

In the example embodiment, processor 402 may be programmed by encoding an operation using one or more executable instructions and providing the executable instructions in the memory device 404. In the example embodiment, the processor 402 is programmed to select a plurality of measurements that are received from data acquisition devices.

In operation, a computer executes computer-executable instructions embodied in one or more computer-executable components stored on one or more computer-readable media to implement aspects of the disclosure described or illustrated herein. The order of execution or performance of the operations in embodiments of the disclosure illustrated and described herein is not essential, unless otherwise specified. That is, the operations may be performed in any order, unless otherwise specified, and embodiments of the disclosure may include additional or fewer operations than those disclosed herein. For example, it is contemplated that executing or performing a particular operation before, contemporaneously with, or after another operation is within the scope of aspects of the disclosure.

An example technical effect of the methods, systems, and apparatus described herein includes at least one of: (a) enabling identification of misaligned sensors of a vehicle by computing a predicted velocity vector based on data received from the sensor and comparing the data to a known direction of motion of the vehicle (b) enabling identification of misaligned sensors of a vehicle while the vehicle is online by computing a predicted velocity vector based on data received from the sensor and comparing the data to a known direction of motion of the vehicle, or (c) improving operation of an autonomous vehicle by correcting data received from misaligned sensors of the autonomous vehicle based on a comparison between a computed velocity vector a known direction of motion of the vehicle.

Some embodiments involve the use of one or more electronic processing or computing devices. As used herein, the terms "processor" and "computer" and related terms, e.g., "processing device," and "computing device" are not limited to just those integrated circuits referred to in the art as a computer, but broadly refers to a processor, a processing device or system, a general purpose central processing unit (CPU), a graphics processing unit (GPU), a microcontroller, a microcomputer, a programmable logic controller (PLC), a reduced instruction set computer (RISC) processor, a field programmable gate array (FPGA), a digital signal processor (DSP), an application specific integrated circuit (ASIC), and other programmable circuits or processing devices capable of executing the functions described herein, and these terms are used interchangeably herein. These processing devices are generally "configured" to execute functions by programming or being programmed, or by the provisioning of instructions for execution. The above examples are not intended to limit in any way the definition or meaning of the terms processor, processing device, and related terms.

The various aspects illustrated by logical blocks, modules, circuits, processes, algorithms, and algorithm steps described above may be implemented as electronic hardware, software, or combinations of both. Certain disclosed components, blocks, modules, circuits, and steps are described in terms of their functionality, illustrating the interchangeability of their implementation in electronic hardware or software. The implementation of such functionality varies among different applications given varying system architectures and design constraints. Although such implementations may vary from application to application, they do not constitute a departure from the scope of this disclosure.

Aspects of embodiments implemented in software may be implemented in program code, application software, application programming interfaces (APIs), firmware, middleware, microcode, hardware description languages (HDLs), or any combination thereof. A code segment or machine-executable instruction may represent a procedure, a function, a subprogram, a routine, a subroutine, a module, a software package, a class, or any combination of instructions, data structures, or program statements. A code segment may be coupled to, or integrated with, another code segment or an electronic hardware by passing or receiving information, data, arguments, parameters, memory contents, or memory locations. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the disclosed functions may be embodied, or stored, as one or more instructions or code on or in memory. In the embodiments described herein, memory includes non-transitory computer-readable media, which may include, but is not limited to, media such as flash memory, a random access memory (RAM), read-only memory (ROM), erasable programmable read-only memory (EPROM), electrically erasable programmable read-only memory (EEPROM), and non-volatile RAM (NVRAM). As used herein, the term "non-transitory computer-readable media" is intended to be representative of any tangible, computer-readable media, including, without limitation, non-transitory computer storage devices, including, without limitation, volatile and non-volatile media, and removable and non-removable media such as a firmware, physical and virtual storage, CD-ROM, DVD, and any other digital source such as a network, a server, cloud system, or the Internet, as well as yet to be developed digital means, with the sole exception being a transitory propagating signal. The methods described herein may be embodied as executable instructions, e.g., "software" and "firmware," in a non-transitory computer-readable medium. As used herein, the terms "software" and "firmware" are interchangeable and include any computer program stored in memory for execution by personal computers, workstations, clients, and servers. Such instructions, when executed by a processor, configure the processor to perform at least a portion of the disclosed methods.

As used herein, an element or step recited in the singular and proceeded with the word "a" or "an" should be understood as not excluding plural elements or steps unless such exclusion is explicitly recited. Furthermore, references to "one embodiment" of the disclosure or an "exemplary" or "example" embodiment are not intended to be interpreted as excluding the existence of additional embodiments that also incorporate the recited features. Likewise, limitations associated with "one embodiment" or "an embodiment" should not be interpreted as limiting to all embodiments unless explicitly recited.

Disjunctive language such as the phrase "at least one of X, Y, or Z," unless specifically stated otherwise, is generally intended, within the context presented, to disclose that an item, term, etc. may be either X, Y, or Z, or any combination thereof (e.g., X, Y, and/or Z). Likewise, conjunctive language such as the phrase "at least one of X, Y, and Z," unless specifically stated otherwise, is generally intended, within the context presented, to disclose at least one of X, at least one of Y, and at least one of Z.

The disclosed systems and methods are not limited to the specific embodiments described herein. Rather, components of the systems or steps of the methods may be utilized independently and separately from other described components or steps.

This written description uses examples to disclose various embodiments, which include the best mode, to enable any person skilled in the art to practice those embodiments, including making and using any devices or systems and performing any incorporated methods. The patentable scope is defined by the claims and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system for sensor calibration, the system comprising a processor in communication with a memory device and a plurality of LiDAR sensors of an autonomous vehicle, the processor configured to:

detect, based on data received from a first LiDAR sensor of the plurality of LiDAR sensors, a relative velocity of the autonomous vehicle to a position of a static object while the autonomous vehicle is traveling along a straight trajectory;

compute, based on the relative velocity, a vector representing a velocity estimate of the autonomous vehicle, the vector including a lateral component;

identify the first LiDAR sensor as misaligned when the lateral component of the computed vector is greater than a threshold lateral component; and store, in the memory device, a status of the first LiDAR sensor as misaligned, wherein the autonomous vehicle is controlled based in part on the status of the first LiDAR sensor.

2. The system of claim 1, wherein the processor is further configured to determine the autonomous vehicle is traveling along a straight trajectory based on a vertical angular rate or a lateral acceleration measurement generated by an inertial sensor of the autonomous vehicle.

3. The system of claim 1, wherein the processor is further configured to determine the autonomous vehicle is traveling along a straight trajectory based on steering data generated by a vehicle controller of the autonomous vehicle.

4. The system of claim 1, wherein to detect the position of the static object, the processor is further configured to apply a random sample consensus (RANSAC) object detection algorithm or a machine learning model to the data received from the first LiDAR sensor.

5. The system of claim 1, wherein to compute the vector, the processor is further configured to:

compute an unfiltered vector based on the relative velocity; and compute the vector by applying a filter to the unfiltered vector.

6. The system of claim 5, wherein the filter is a Kalman filter.

7. The system of claim 1, wherein the vector is expressed in one dimension, two dimensions, or three dimensions.

8. The system of claim 1, wherein the computed vector further includes a longitudinal component.

9. The system of claim 1, wherein the processor is further configured to determine a misalignment angle based on the computed vector.

10. The system of claim 9, wherein the autonomous vehicle is controlled based in part on the misalignment angle.

11. A method for sensor calibration, the method performed by a processor in communication with a memory device and a plurality of LiDAR sensors of an autonomous vehicle, the method comprising:

detecting, based on data received from a first LiDAR sensor of the plurality of LiDAR sensors, a relative velocity of the autonomous vehicle to a position of a static object while the autonomous vehicle is traveling along a straight trajectory;

computing, based on the relative velocity, a vector representing a velocity estimate of the autonomous vehicle, the vector including a lateral component;

identifying the first LiDAR sensor as misaligned when the lateral component of the computed vector is greater than a threshold lateral component; and storing, in the memory device, a status of the first LiDAR sensor as misaligned, wherein the autonomous vehicle is controlled based in part on the status of the first LiDAR sensor.

12. The method of claim 11, further comprising determining the autonomous vehicle is traveling along a straight trajectory based on a vertical angular rate or a lateral acceleration measurement generated by an inertial sensor of the autonomous vehicle.

13. The method of claim 11, further comprising determining the autonomous vehicle is traveling along a straight trajectory based on steering data generated by a vehicle controller of the autonomous vehicle.

14. The method of claim 11, wherein detecting the position of the static object comprises applying a random sample consensus (RANSAC) object detection algorithm or a machine learning model to the data received from the first LiDAR sensor.

15. The method of claim 11, wherein computing the vector comprises:

computing an unfiltered vector based on the relative velocity; and computing the vector by applying a filter to the unfiltered vector.

16. The method of claim 15, wherein the filter is a Kalman filter.

17. The method of claim 11, wherein the vector is expressed in one dimension, two dimensions, or three dimensions.

18. The method of claim 11, wherein the computed vector further includes a longitudinal component.

19. The method of claim 11, further comprising determining a misalignment angle based on the computed vector, wherein the autonomous vehicle is controlled based in part on the misalignment angle.

20. An autonomous vehicle comprising:

a plurality of LiDAR sensors;

a memory device; and a processor in communication with the memory device and the plurality of LiDAR sensors, the processor configured to:

detect, based on data received from a first LiDAR sensor of the plurality of LiDAR sensors, a relative velocity of the autonomous vehicle to a position of a static object while the autonomous vehicle is traveling along a straight trajectory;

compute, based on the relative velocity, a vector representing a velocity estimate of the autonomous vehicle, the vector including a lateral component;

identify the first LiDAR sensor as misaligned when the lateral component of the computed vector is greater than a threshold lateral component;

store, in the memory device, a status of the first LiDAR sensor as misaligned; and control the autonomous vehicle based in part on the status of the first LiDAR sensor.

* * * * *